United States Patent
Fernald et al.

(10) Patent No.: US 9,647,824 B2
(45) Date of Patent: May 9, 2017

(54) SYSTEM AND APPARATUS FOR CLOCK RETIMING WITH CATCH-UP MODE AND ASSOCIATED METHODS

(71) Applicant: Silicon Laboratories Inc., Austin, TX (US)

(72) Inventors: Kenneth W. Fernald, Austin, TX (US); Imranul Islam, San Marcos, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/523,599

(22) Filed: Oct. 24, 2014

(65) Prior Publication Data

US 2016/0119111 A1  Apr. 28, 2016

(51) Int. Cl.
*H04L 7/00* (2006.01)
*H04L 7/033* (2006.01)

(52) U.S. Cl.
CPC .......... *H04L 7/0016* (2013.01); *H04L 7/0338* (2013.01)

(58) Field of Classification Search
None
See application file for complete search history.

(56) References Cited

U.S. PATENT DOCUMENTS

| | | | |
|---|---|---|---|
| 4,696,016 A * | 9/1987 | Rozema | H04L 7/0331 327/165 |
| 5,532,632 A | 7/1996 | Kent | |
| 6,873,318 B1 | 3/2005 | Wong | |
| 8,014,476 B2 | 9/2011 | Filipovic et al. | |
| 2001/0033188 A1* | 10/2001 | Aung et al. | 327/141 |
| 2004/0010677 A1* | 1/2004 | Yoon | G06F 8/60 712/35 |
| 2005/0186920 A1* | 8/2005 | Staszewski | H03L 7/16 455/114.1 |
| 2007/0110199 A1* | 5/2007 | Momtaz | H04L 7/0331 375/350 |
| 2011/0235459 A1* | 9/2011 | Ware | G11C 7/04 365/233.11 |
| 2014/0070865 A1* | 3/2014 | Fortier | G06F 1/24 327/296 |

* cited by examiner

*Primary Examiner* — Leon-Viet Nguyen
(74) *Attorney, Agent, or Firm* — Law Offices of Maximilian R. Peterson (57) ABSTRACT

An apparatus includes analog or mixed-signal circuitry that operates in response to a first signal, and digital circuitry that operates in response to a second signal. The apparatus further includes a signal retiming circuit. The signal retiming circuit retimes an output signal of a digital signal source to reduce interference between the digital circuitry and the analog or mixed-signal circuitry by retiming edges of the output signal of the digital signal source to fall on cycle boundaries of the first signal.

20 Claims, 8 Drawing Sheets

PRIOR ART

SYSTEM AND APPARATUS FOR CLOCK RETIMING WITH CATCH-UP MODE AND ASSOCIATED METHODS

TECHNICAL FIELD

The disclosure relates generally to clock signal conditioning and, more particularly, to system and apparatus for clock retiming with catch-up mode in some embodiment, and associated methods.

BACKGROUND

Combining digital logic and radio-frequency (RF) circuits on the same integrated circuit (IC), or even printed circuit board (PCB), introduces the likelihood of the digital logic interfering with radio operations. More specifically, the energy of the interference at certain frequencies, such as harmonics of the digital clock frequency, can appear to an RF receiver as an in-band signal that may interfere with actual incoming (or even transmitted) radio signals at or near those frequencies. Several conventional techniques exist for combating the interference, are known to persons of ordinary skill in the art, and are therefore briefly described below.

Figure 1A:
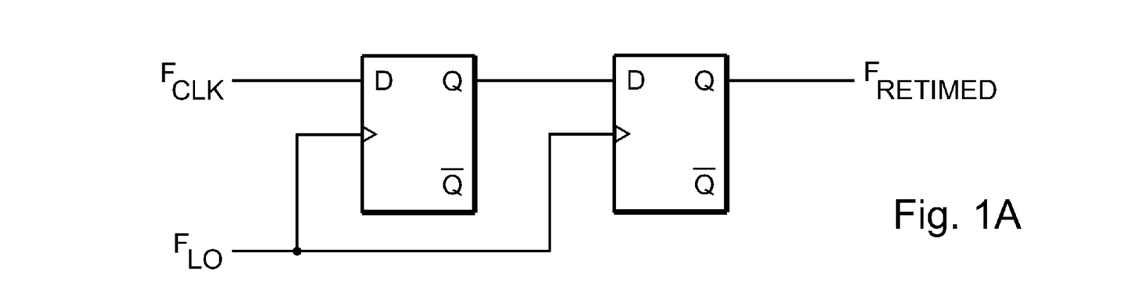
FIGS. 1A-1B illustrate, respectively, a conventional synchronizer and its associated timing diagram.
Figure 1B:
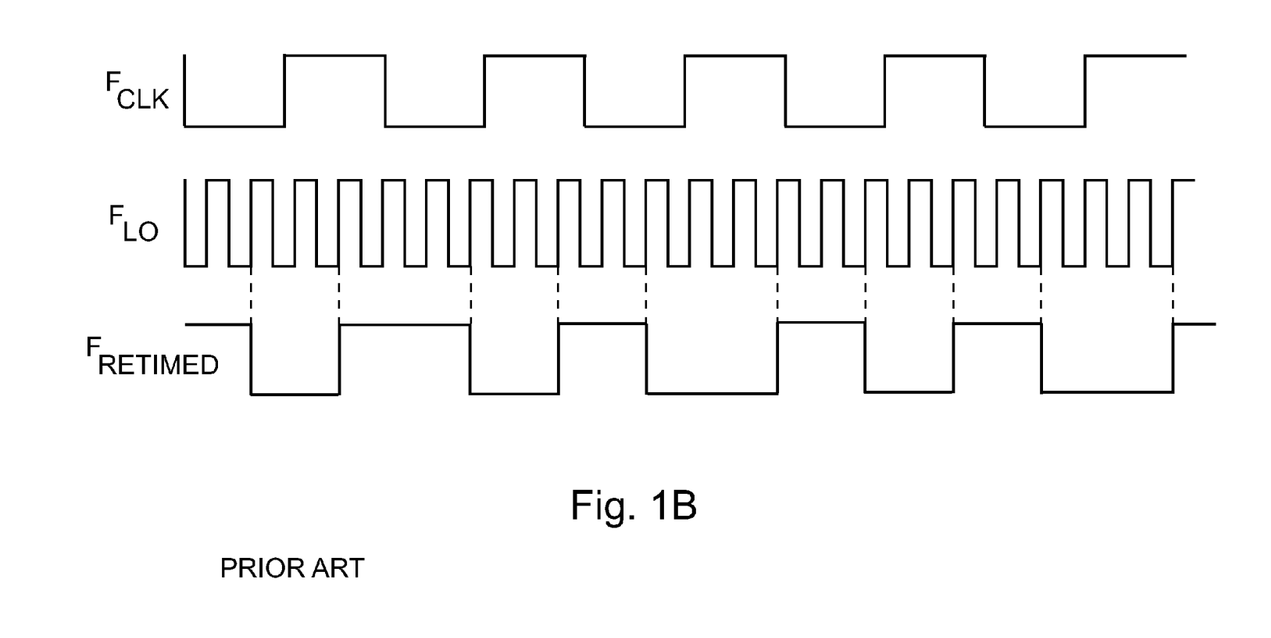

FIGS. 1A-1B show, respectively, a conventional digital synchronizer used to modulate digital clock edges, and associated timing signals. As seen in FIG. 1B, although the average frequency of the resulting $F_{RETIMED}$ clock is not altered, edges of that clock are moved to align with edges of $F_{LO}$. Doing so changes the harmonics of the resulting digital clock to generate less interference in an RF band based on $F_{LO}$. The retimed output can exhibit shorter times between adjacent edges than the original clock. The minimum retimed edge-to-edge delay for the example above is given by:

$$T_{MIN_{RETIMED_{E2E}}} = \frac{INT(T_{MIN_{CLK_{E2E}}} \cdot F_{LO})}{F_{LO}}$$

where $T_{MIN\_CLK\_E2E}$ is the minimum edge-to-edge time for the clock frequency, $F_{CLK}$, and $F_{LO}$ represents a local oscillator frequency of an RF receiver. Because of the integer function, INT( ), which truncates its parameter to an integer smaller than or equal to the parameter, the minimum retimed edge-to-edge time is generally less than the original edge-to-edge time. If the duty-cycle of the original clock is not close to 50%, and the $F_{LO}$ is not very much larger than $F_{CLK}$, the retimed edge-to-edge time can be significantly shorter than $T_{MIN\_CLK\_E2E}$. This may result digital logic running from the retimed clock and having critical signal paths between registers clocking on opposite clock edges to be capable of running at a much faster speed than if running from the original clock, $F_{CLK}$. The digital logic's increased frequency may increase both power and area (on an IC) of the digital logic.

SUMMARY

According to an exemplary embodiment, an apparatus includes analog or mixed-signal circuitry that operates in response to a first signal, and digital circuitry that operates in response to a second signal. The apparatus further includes a signal retiming circuit. The signal retiming circuit retimes an output signal of a digital signal source to reduce interference between the digital circuitry and the analog or mixed-signal circuitry by retiming edges of the output signal of the digital signal source to fall on cycle boundaries of the first signal.

According to another exemplary embodiment, an apparatus includes a first circuit that operates in response to a first signal, and a second circuit that operates selectably in response to a second signal or a retimed version of the second signal. The apparatus further includes a signal retiming circuit. The signal retiming circuit retimes the second signal to generate the retimed version of the second signal, and manages transition of operation of the second circuit in response to the second signal or the retimed version of the second signal without generating glitches and missing or extra cycles in the retimed version of the second signal.

According to another exemplary embodiment, an apparatus includes a circuit that operates selectably in response to a signal or a retimed version of the signal. The apparatus further includes a signal retiming circuit that manages transition of operation of the circuit in response to the retimed version of the signal to operation of the circuit in response to the signal by using a catch-up mode.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to reference or source signal (e.g., clock signal) conditioning, for example, in apparatus or systems that combine RF circuitry (e.g., receiver, transmitter, transceiver) with digital logic circuitry (e.g., processors, microcontroller units (MCUs), and the like). More specifically, the disclosed concepts provide system, apparatus, and methods for clock signal retiming and, in some exemplary embodiments, providing a catch-up mode.

For example, when used in conjunction with RF circuitry, the disclosure describes techniques for reducing interference (e.g., radio interference) generated by a digital clock by retiming edges of the digital clock to fall on cycle boundaries of a local oscillator (LO) used by the RF circuitry. Furthermore, exemplary embodiments provide mechanisms for management of transitions between a raw clock and a retimed version of that clock while maintaining a specified minimum edge-to-edge time and period for the resulting output clock, as well as a catch-up mode, as desired.

As noted above, exemplary embodiments provide a mechanism and related techniques for retiming clock signals in order to reduce or eliminate interference between a digital circuit, such as a circuit having a clock signal, and another circuit, for example a signal processing circuit, that is susceptible to interference, for example, an RF circuit. Interference reduction is accomplished by retiming a signal (e.g., a clock signal) in the digital circuit with a signal in the other circuit (e.g., an LO signal).

Figure 2:
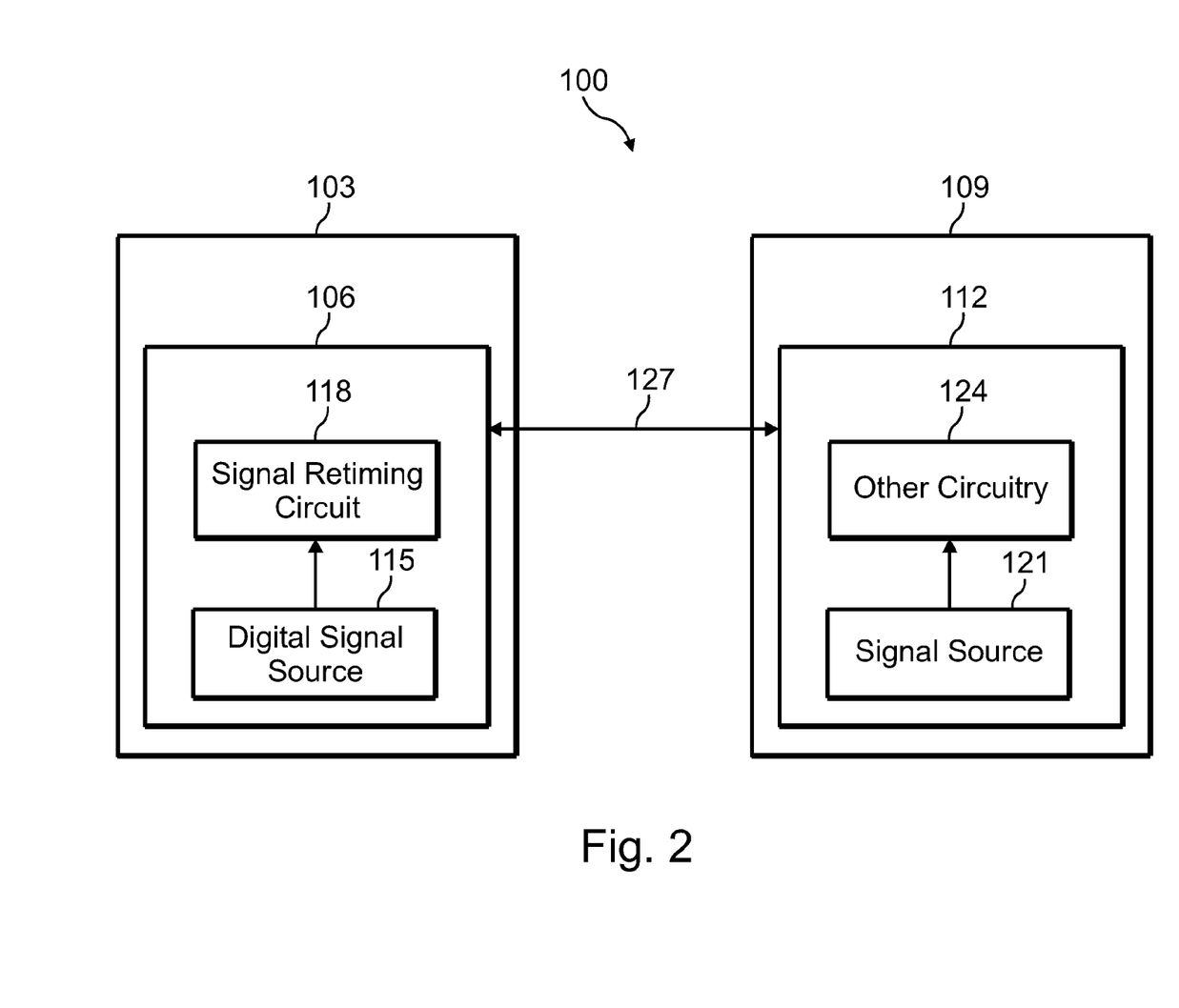
FIG. 2 depicts a system according to an exemplary embodiment.

FIG. 2 illustrates a system 100 according to an exemplary embodiment. System 100 includes a circuit partition 103 and a circuit partition 109. A link 127 couples circuit partition 103 to circuit partition 109. Link 127 may include a coupling mechanism, such as a bus, a desired number of conductors (e.g., traces in an IC or in or on a PCB), etc. Circuit partitions 103 and 109 may communicate one or more signals via link 127.

Circuit partition 103 includes digital circuit 106. Digital circuit 106 includes digital signal source 115. Without loss of generality, this disclosure may refer to digital signal source 115 as a source of a clock signal, $F_{CLK}$. As persons of ordinary skill in the art understand, however, digital signal source 115 may constitute other types of circuitry or generate signals known by other names.

Circuit partition 109 includes signal processing circuit 112. Signal processing circuit 112 includes a signal source 121 coupled to other circuitry or processing circuitry 124, for example, circuitry that performs analog or digital or mixed-signal signal processing on one or more signals (not shown). Signal source 121 provides a signal to processing circuitry 124. Processing circuitry 124 uses the signal received from signal source 121 perform the signal processing on the one or more signals (not shown).

Digital circuit 106 includes signal retiming circuit 118. Signal retiming circuit 118 retimes the digital signal provided by digital signal source 115 with the signal provided by signal source 121 (e.g., by communicating the signal provided by signal source 121 to digital signal retiming circuit 118 via link 127). As a result of the retiming of digital signal provided by digital signal source 115, interference between circuit partitions 103 and 109 is reduced or eliminated. The retimed digital signal may be used by digital circuit 106 to perform operations, for example, use the retimed digital signal as a clock signal to perform digital logic operations.

For example, in exemplary embodiments, circuitry in circuit partition 109 (e.g., signal processing circuit 112) may operate on one or more analog or mixed-signal signals. By their nature, such signals (and the circuitry that processes them) may be susceptible to interference, such as interference generated by digital signal source 115. The retiming operation (and the use of the retimed signal, as noted above), reduces or eliminates the interference.

In exemplary embodiments, signal retiming circuit 118 retimes the edges of the output signal of digital signal source 115 to fall on cycle boundaries of the output signal of signal source 121. In other exemplary embodiments, signal retiming circuit 118 provides for management of transitions between the output signal of digital signal source 115 and a retimed version of that output signal while maintaining a specified minimum edge-to-edge time and period for the resulting retimed signal. In yet other exemplary embodiments, management of the transitions (entry and exit from retimed or retiming mode) includes performing the retiming operation such that: (a) entry into and exit from the retimed mode is accomplished without generating output glitches, missing clock cycles or extra clock cycles; and (b) exit from the retimed mode includes a catch-up mode, as described below in detail.

Figure 3:
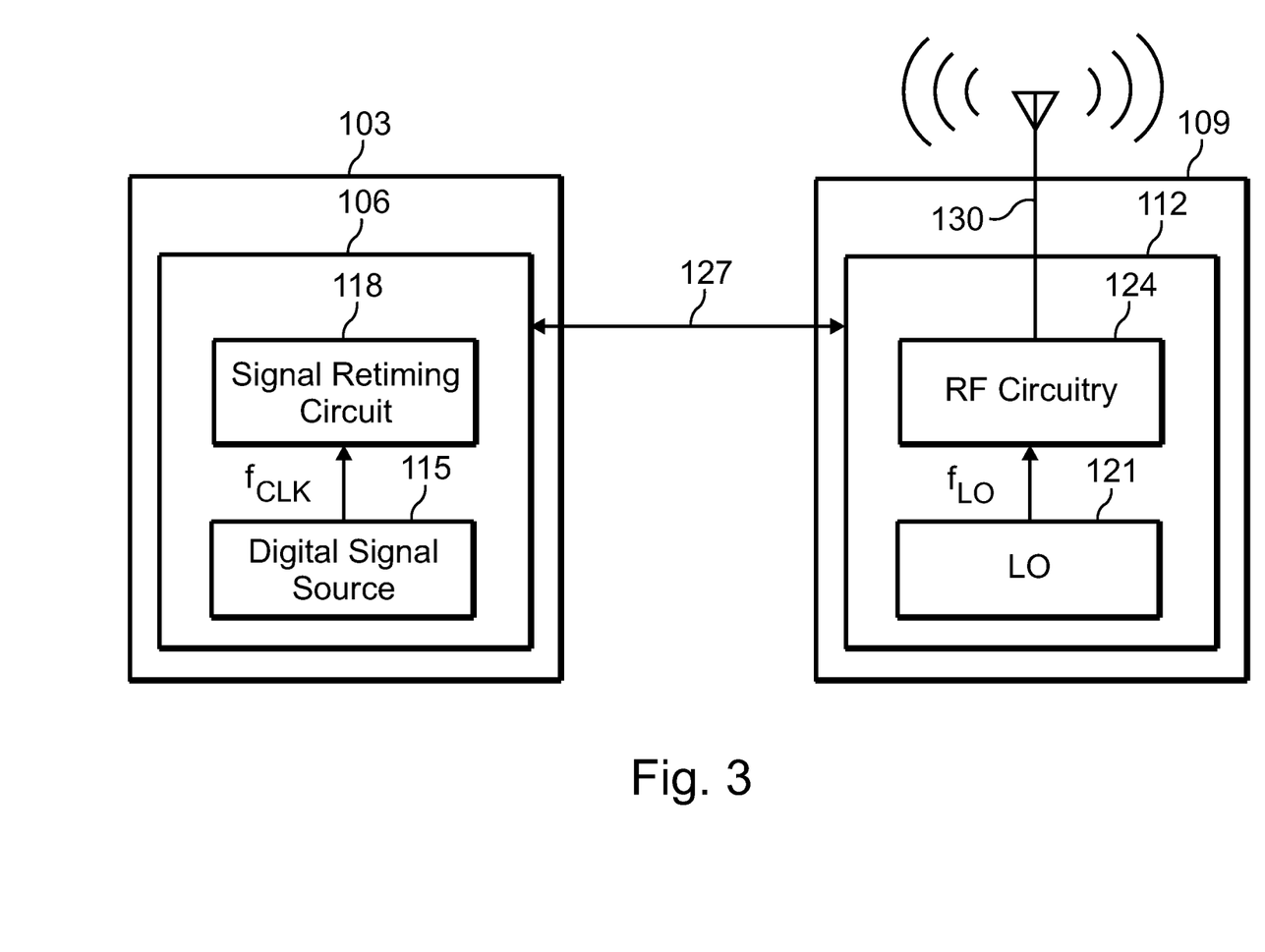
FIG. 3 shows an exemplary embodiment that includes RF circuitry and digital circuitry.

In some embodiments, circuit partition 109 may include RF circuitry. As noted above, the RF circuitry might constitute receiver, transmitter, or transceiver circuitry. FIG. 3 shows an exemplary embodiment in which circuit partition 109 includes RF circuitry.

In exemplary embodiments, such as the embodiment shown in FIG. 3, RF circuitry 124 uses antenna 130 to communicate wirelessly with a receiver, transmitter, or transceiver. RF circuitry 124 may include receive functionality, transmit functionality, or both (i.e., transceiver functionality).

More specifically, RF circuitry 124 may include one or more of mixers, down-converters, up-converters, low-noise amplifiers, power amplifiers, etc. One or more of the circuits in RF circuitry 124 use the output signal $F_{LO}$ of LO 121 to perform their functions. For example, a mixer or down-converter may use signal $F_{LO}$.

Similar to FIG. 2, circuit partition 103 in FIG. 3 includes digital circuit 106. Digital circuit 106 includes digital signal source 115, such as a source of a clock signal, $F_{CLK}$. Without loss of generality, digital circuit 106 may include in exemplary embodiments one or more processors, microprocessors, MCUs, digital signal processors (DSPs), baseband processor circuitry (e.g., to operate in conjunction with RF circuitry 124) and the like.

In some embodiments, digital circuit 106 includes an MCU (not shown in FIG. 3). The MCU couples to RF circuitry 124 via link 127. The MCU may facilitate operation of RF circuitry 124, act as a host to RF circuitry 124, or perform operations on output signals of RF circuitry 124, etc., as desired. For example, digital circuit 106 may include circuitry for performing baseband operations such as frame synchronization, encryption or decryption, data interleaving and de-interleaving, bit stuff and de-stuffing, packet assembly and disassembly, error detection and correction, and transmission and reception scheduling.

As noted, circuit partition 109 includes signal processing circuit 112, including RF circuitry 124. In addition, circuit partition 109 may include circuitry that performs analog or digital or mixed-signal signal processing on one or more signals (not shown). Digital circuit 106 includes signal retiming circuit 118. Signal retiming circuit 118 retimes the clock signal $F_{CLK}$ provided by digital signal source 115 with the signal ($F_{LO}$) provided by LO 121 (e.g., by communicating the signal provided by signal source 121 to digital signal retiming circuit 118 via link 127).

As a result of the retiming of the digital signal provided by digital signal source 115, interference between circuit partitions 103 and 109 is reduced or eliminated. The retimed digital signal may be used by digital circuit 106 to perform operations, for example, by using the retimed digital signal as a clock signal to perform digital logic operations.

For example, in exemplary embodiments, circuitry in circuit partition 109 (e.g., signal processing circuit 112 and/or RF circuitry 124) may operate on one or more analog or mixed-signal signals. By their nature, such signals (and the circuitry that processes them) may be susceptible to interference, such as interference generated by digital signal source 115. The retiming operation (and the use of the retimed signal, as noted above), reduces or eliminates the interference.

In exemplary embodiments, signal retiming circuit 118 retimes the edges of the output signal of digital signal source 115 to fall on cycle boundaries of the output signal of signal source 121. In other exemplary embodiments, signal retiming circuit 118 provides for management of transitions between the output signal of digital signal source 115 and a retimed version of that output signal while maintaining a specified minimum edge-to-edge time and period for the resulting retimed signal. In yet other exemplary embodiments, management of the transitions (entry and exit from retimed or retiming mode) includes performing the retiming operation such that: (a) entry into and exit from the retimed mode is accomplished without generating output glitches, missing clock cycles or extra clock cycles; and (b) exit from the retimed mode includes a catch-up mode, as described below in detail.

Note that reference to circuit partitions (e.g., circuit partitions 103 and 109) does not necessarily denote physical partitioning of circuitry. In some exemplary embodiments, circuit partitions 103 and 109 may be included or fabricated within an IC. The circuitry may be on the same die, and may or may not have physical portioning (e.g., fabricated in different parts of the die, or may be partitioned from a signal flow perspective, or both).

In other exemplary embodiments, circuit partitions 103 and 109 may be included or fabricated within an IC, but on separate die, for example, in a multi-chip module (MCM) arrangement. In this situation, the circuit partitions are more physically separated than if fabricated on the same die. The circuit partitions may or may not be partitioned from a signal-flow perspective, as desired.

In other exemplary embodiments, circuit partitions 103 and 109 may be fabricated on a PCB, for example, two ICs on a PCB. In this case, the circuit partitions are separated or partitioned physically by virtue of residing in two physical packages. The circuit partitions may or may not be partitioned from a signal-flow perspective, as desired.

Figure 4:
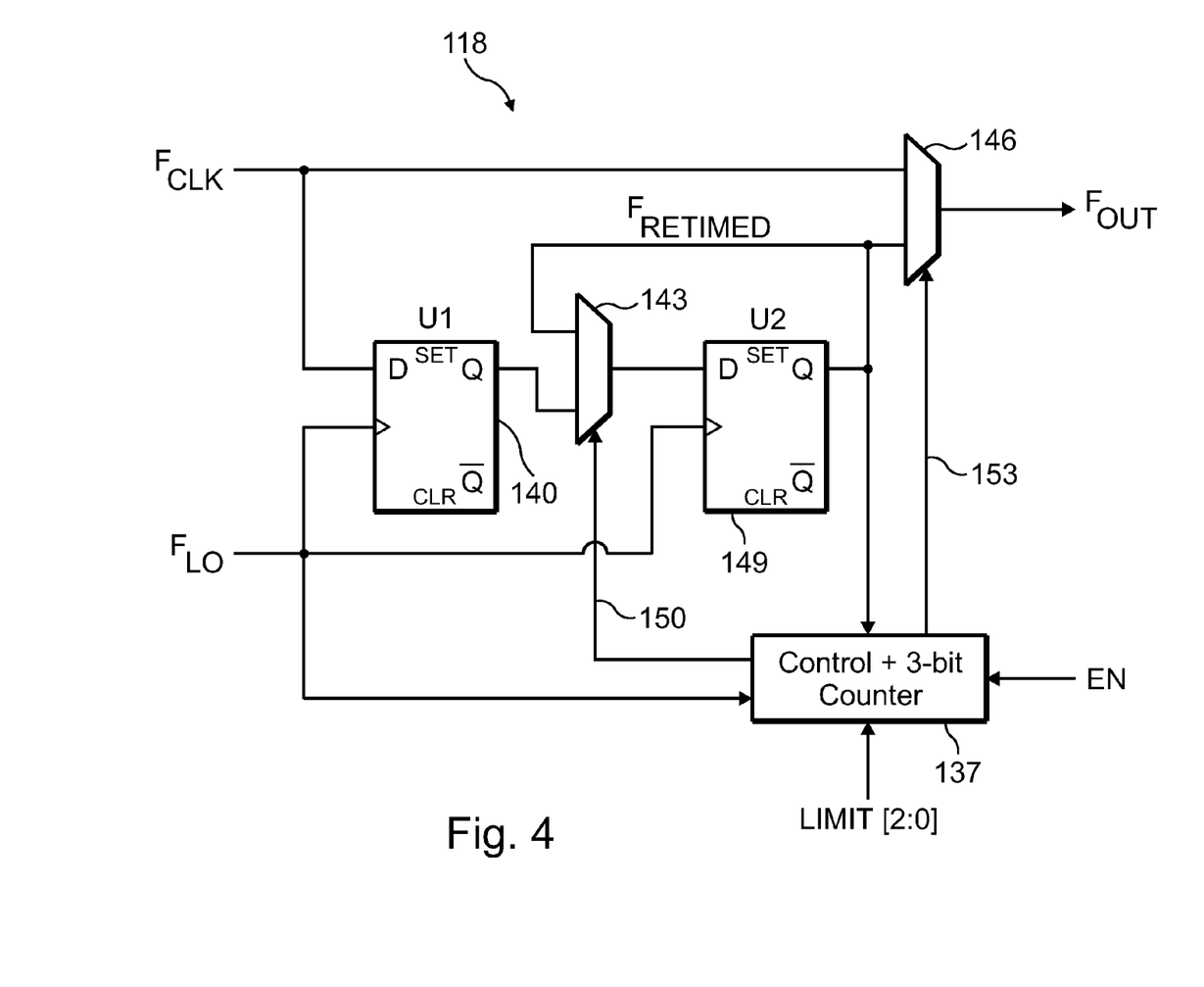
FIG. 4 depicts a signal retiming circuit according to an exemplary embodiment.

One aspect of the disclosure relates to providing a retimed signal that has desired or prescribed timing characteristics. FIG. 4 depicts an exemplary embodiment that provides such functionality.

A block diagram of a signal retiming circuit 118 according to an exemplary embodiment is illustrated in FIG. 4. Signal retiming circuit 118 can provide a desired minimum amount of time in the edge-to-edge transitions and a minimum period for the retimed signal, e.g., the output signal ($F_{OUT}$) of signal retiming circuit 118 (see FIGS. 2 and 3).

Referring to FIG. 4, signal retiming circuit 118 includes a limit counter 137 that runs from or is clocked by the $F_{LO}$ signal. Limit counter 137 includes control circuitry and a counter having a desired number of bits, for instance three bits in the example shown in FIG. 4. If enabled via enable signal EN, limit counter 137 measures the number of $F_{LO}$ periods during which the $F_{RETIMED}$ clock is either high or low, and associated logic circuitry prevents a change in the $F_{RETIMED}$ output until the $F_{RETIMED}$ signal has been high or low for at least a given number of $F_{LO}$ periods.

The number of $F_{LO}$ periods for which the $F_{RETIMED}$ signal has been high or low is prescribed by a LIMIT input to limit counter 137. In the example shown in FIG. 4, the LIMIT signal is a 3-bit word, having bits 0 through 2.

Use of limit counter 137 provides a retimed signal that has both a minimum edge-to-edge time and a minimum period in the retimed output. As long as the minimum edge-to-edge time is less than one-half the period of $F_{CLK}$, the retiming circuit continues to provide a retimed signal with the characteristics described above.

Flip-flops 140 and 149 provide a synchronizer function. A hold multiplexer ("MUX") 143 is added between flip-flops 140 and 149 to hold or freeze the retimed output until limit counter 137 detects that the time between edges of the retimed output has reached the value LIMIT. Limit counter 137 signals this event to hold MUX 143 via select signal 150.

The circuit in FIG. 4 also allows selecting as the output signal, $F_{OUT}$, either the original clock signal, $F_{CLK}$, or the retimed clock signal, $F_{RETIMED}$. Specifically, using select signal 153, limit counter 137 may control MUX 146 to provide either the $F_{CLK}$ signal (exit or cease the retiming or retimed mode) or the $F_{RETIMED}$ signal (enter or use the retiming or retimed mode). Depending on the nature of the circuits operating from the $F_{OUT}$ signal, transitions between $F_{RETIMED}$ and $F_{CLK}$ may or may not be allowed to generate glitches or extra clock cycles. If glitches are allowed, the control to MUX 146 can change at any time with respect to the phase of the inputs of MUX 146. If glitches are not allowed, limit counter 137 can, for example, change the state of the control to MUX 146 only with the other inputs to MUX 146 are both at logic low or both at logic high.

Although the embodiment in FIG. 4 shows one flip-flop 140 before hold MUX 143, two or more flip-flops in cascade may be used to reduce the likelihood of a metastability fault in the circuit. In addition, hold MUX 143 before flip-flop 149 can be replaced with other circuits to allow the output state of flip-flop 149 to be held, for example by using a clock-gating circuit.

Figure 5:
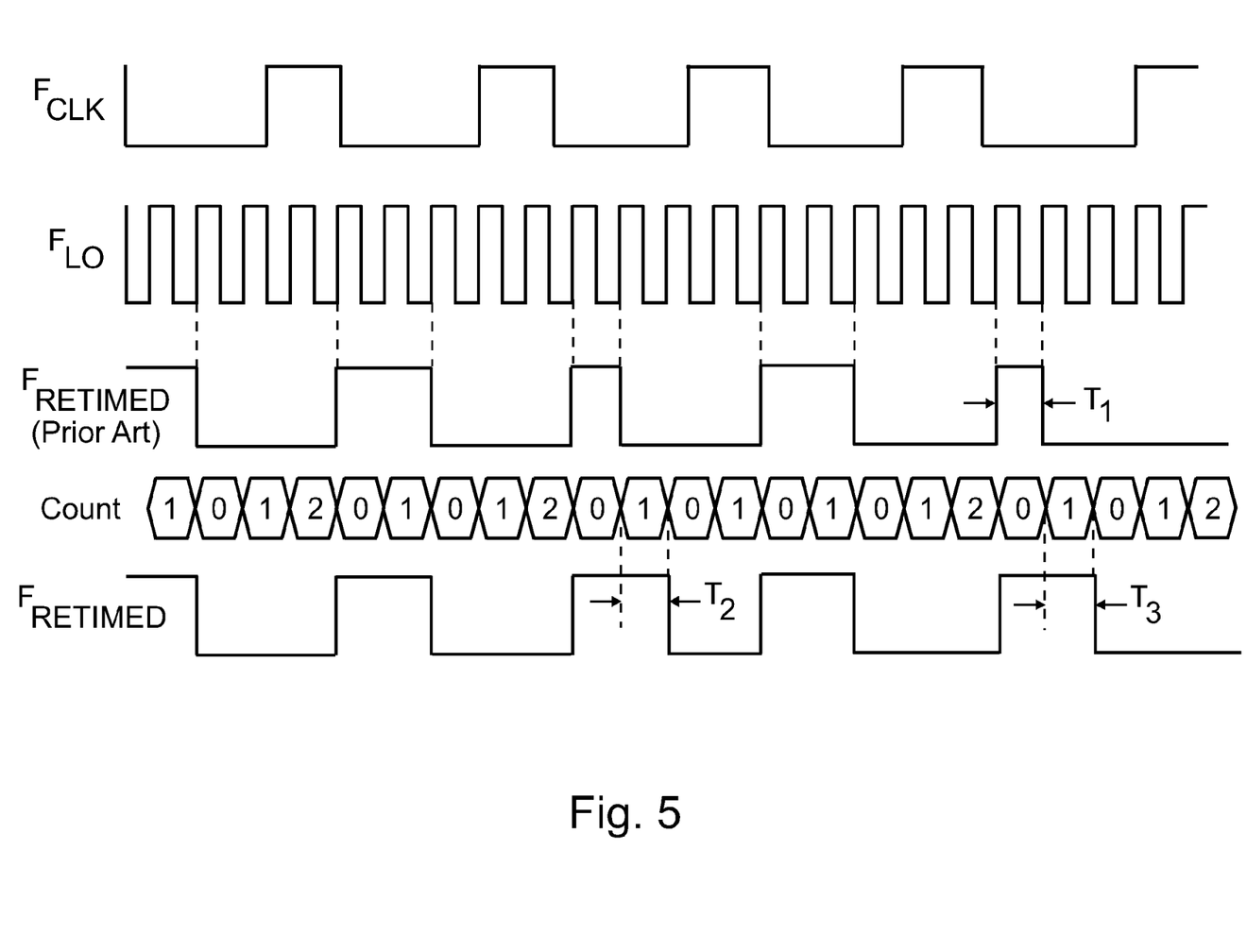
FIG. 5 illustrates a timing diagram for the exemplary embodiment in FIG. 4.

FIG. 5 illustrates a timing diagram for the circuit in FIG. 4. Note that, in addition to clock signal $F_{CLK}$, LO signal $F_{LO}$, and the $F_{RETIMED}$ signal for the circuit of FIG. 4, for comparison purposes FIG. 5 also includes the $F_{RETIMED}$ signal (labeled "$F_{RETIMED}$ (prior art)") of the conventional circuit shown in FIG. 1.

Referring to FIG. 5, note that in the example shown, the duty-cycle of $F_{CLK}$ is well below 50%. Due to the relatively low duty-cycle, the conventional retiming method discussed above in connection with FIG. 1 generates some edge-to-edge times as low as one $F_{LO}$ period, such as the time period labeled "$T_1$" in FIG. 5.

As noted above, however, the circuit shown in FIG. 4 measures the width of the retimed high and low times (using the signal labeled "Count," which represents the state of the counter in limit counter 137), which eliminates the relatively short edge-to-edge times in the retimed signal, $F_{RETIMED}$. In the example shown in FIG. 5, the edge-to-edge times have a minimum of two $F_{LO}$ periods, by adding the time periods indicated by "$T_2$" and "$T_3$" in the figure.

Note that although the exemplary embodiment in FIG. 4 incorporates a single "LIMIT[2:0]" value, other embodiments may support, for example, one limit value used during low outputs, and a second limit value used during high outputs. Such a scheme allows the minimum high and low durations to be configured to different values. In addition, exemplary embodiments may include multiple counters and limits, including a limit to set the minimum period generated at the output, as desired.

Another aspect of the disclosure relates to entering and exiting retimed mode without generating output glitches, missing clock cycles or extra clock cycles. In some applications, such as when an integrated RF circuitry is frequently enabled and disabled, it may be desirable to operate some logic circuitry from $F_{CLK}$ when the RF circuitry is disabled, and operate the logic circuitry from $F_{RETIMED}$ when enabled. One advantage of operating logic circuitry from $F_{CLK}$ relates to power savings. Often the $F_{LO}$ clock used during retiming is generated by a high-frequency oscillator or clock generator, which requires relatively high amounts of power to operate. When $F_{LO}$ is not used by the retiming circuit (for example when the original $F_{CLK}$ is used), power can be reduced by disabling the source of $F_{LO}$.

In some applications, it may also be desirable that entering and exiting retimed mode not affect the average frequency of the generated digital clock. For example, it is generally undesirable for the number of digital clock cycles received during a long period of time to depend on how many times the RF circuitry is enabled or disabled. Such dependency would cause errors in digital timers, baud-rate generators, etc.

Exemplary embodiments allow for "clean" transitions into and out of retimed mode, i.e., without generating glitches, missing clock cycles or extra clock cycles, relative to the raw input clock, for example, $F_{CLK}$. Because of the delay generated by the synchronizing flip-flops 140 and 149 (see FIG. 4), the retimed clock signal, $F_{RETIMED}$, lags in time the input clock signal, $F_{CLK}$.

Depending on the duty-cycle of the $F_{CLK}$ signal, the ratio of the frequencies of $F_{CLK}$ and $F_{LO}$, and the number of synchronizing flip-flops used, the time lag can be large enough to cause the logic high duration of the $F_{RETIMED}$ and $F_{CLK}$ signals to sometimes not overlap. For an example, see FIG. 5, where the first retimed output stretched by the limit counter happens to rise after the falling edge of its associated $F_{CLK}$ cycle.

Because the frequency or duty-cycle of the $F_{CLK}$ signal may not be well controlled in some applications, it may be undesirable to assume these input and output clocks overlap, making it potentially hazardous (from a noise or glitch perspective) to simply change the select control of MUX 146 (see FIG. 4). Signal retiming circuits according to exemplary embodiments make a transition at their outputs from the $F_{CLK}$ signal to the $F_{RETIMED}$ signal (entering retimed mode) in a glitch-free manner, without making assumptions about the overlap of the two signals that may or may not be valid.

Figure 6:
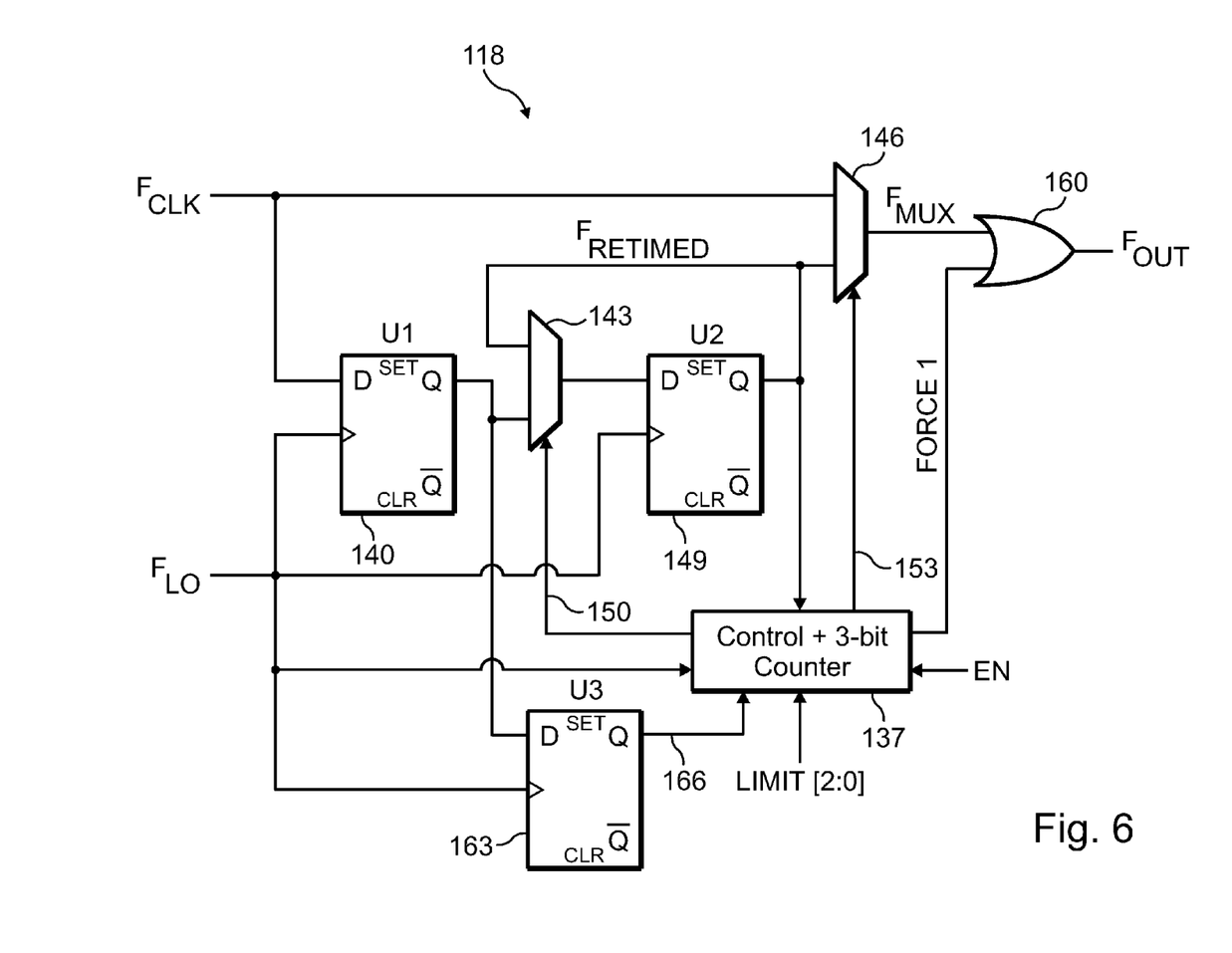
FIG. 6 depicts a signal retiming circuit according to another exemplary embodiment.

Exemplary embodiments provide this feature by performing a logic OR operation on a force-to-one blanking signal and an output signal of the MUX in the output path of the retiming circuit, as FIG. 6 shows. More specifically, limit counter 137 provides a signal FORCE1 to OR gate 160. MUX 146 drives another input of OR gate 160.

Figure 7:
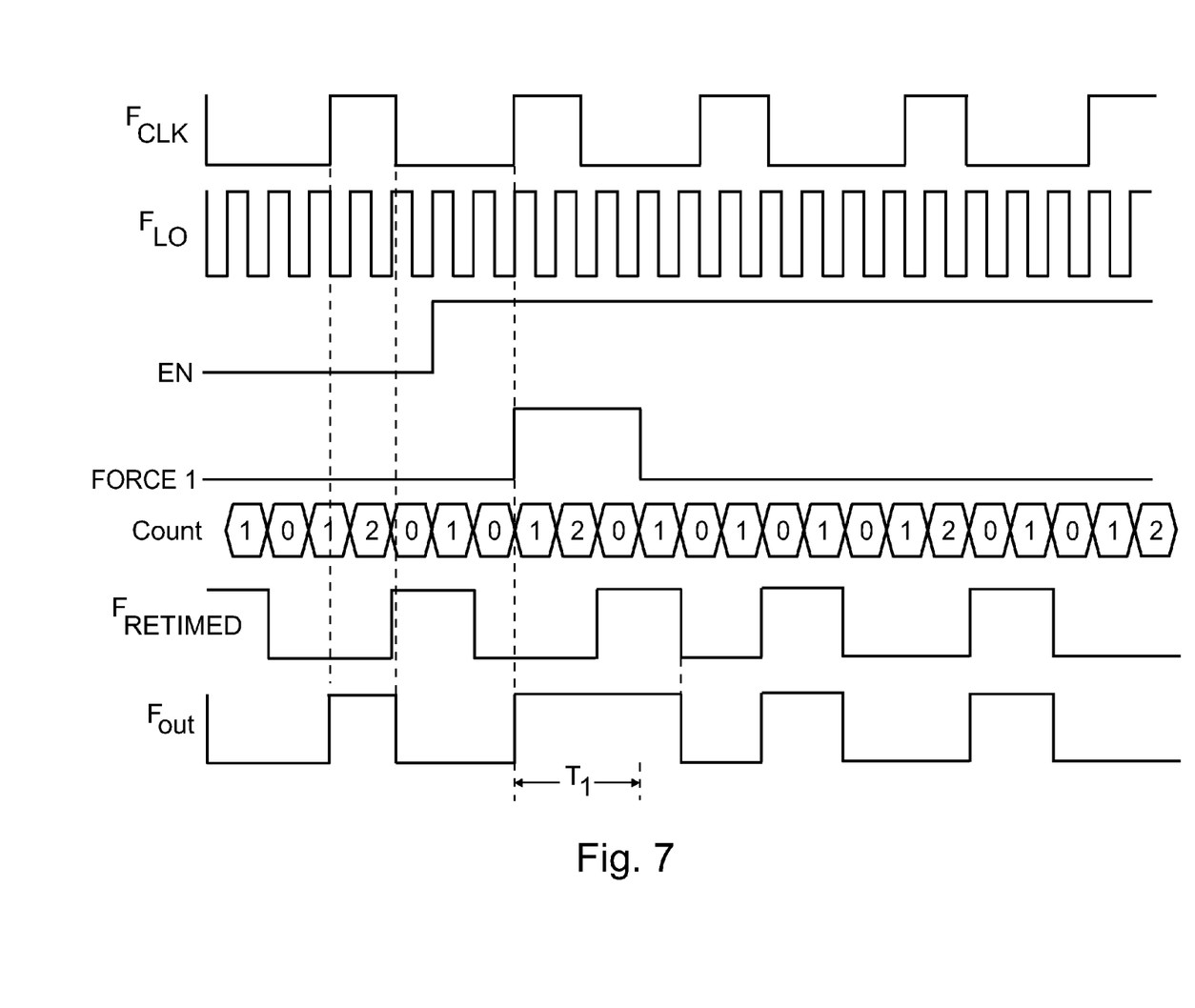
FIG. 7 illustrates a timing diagram for entry into retimed mode for an exemplary embodiment.

FIG. 7 illustrates a timing diagram for entry into retimed mode for the exemplary embodiment of FIG. 4.

When the EN signal (provided to limit counter 137) is detected high, digital logic circuitry in limit counter 137 asserts the FORCE1 signal (to logic high or 1, for normal logic) on or shortly after a subsequent rising edge of $F_{CLK}$, and de-asserts FORCE1 on or shortly after the next rising edge of $F_{RETIMED}$. The state of $F_{CLK}$ is detected by the digital logic circuitry in limit counter 137 using the flip-flop labeled "U3," which combined with flip-flop U1 serves as a synchronizer. While FORCE1 is asserted high, the output $F_{OUT}$ is also forced high by OR gate 160. The delay between this subsequent rising edge of $F_{RETIMED}$ and de-assertion of FORCE1 should be long enough to allow the rising edge of $F_{RETIMED}$ to propagate to OR gate 160. This allows the FORCE1 signal to de-assert without causing a glitch at the output of OR gate 160 since the $F_{RETIMED}$ signal causes OR gate 160 to continue to output a logic high signal until the following falling edge of $F_{RETIMED}$.

As a consequence, the control circuitry in limit counter 137 may switch the output MUX (i.e., MUX 146 in FIG. 6) selection while FORCE1 is high (indicated by the time period labeled "$T_1$" in FIG. 7) without generating a glitch at the output. Since the $F_{RETIMED}$ signal lags $F_{CLK}$, the extended high period at the output ($F_{OUT}$) serves to correct for this lag without generating a glitch, missing clock cycles, or extra clock cycles.

A number of variations are possible and contemplated in exemplary embodiments. For example, some embodiments may generate a FORCE0 signal (not shown) feeding an AND gate (not shown) at the output rather than an OR gate. In such embodiments, the FORCE0 signal would drive low on or shortly after a falling edge of $F_{CLK}$ and return high on or shortly after a falling edge of $F_{RETIMED}$, thereby forcing the output low while the MUX selection (i.e., MUX 146) is changed. Similar to above, the delay between this subsequent falling edge of $F_{RETIMED}$ and de-assertion of FORCE0 should be long enough to allow the falling edge of $F_{RETIMED}$ to propagate to the AND gate. This allows the FORCE0 signal to de-assert without causing a glitch at the output of the AND gate since the $F_{RETIMED}$ signal causes the AND gate to continue to output a logic low until the following rising edge of $F_{RETIMED}$. Furthermore, exemplary embodiments may vary the time at which the FORCE1 or FORCE0 signal is asserted and de-asserted (as well as the time the control to MUX 146 is changed) as long as the generated output, $F_{OUT}$, maintains a continuous logic high or logic low state during the illustrated "T1" period, depending on whether an OR gate or AND gate is used, to allow transition from $F_{CLK}$ to $F_{RETIMED}$ to be made without generating a glitch at the output of the retiming circuitry.

Another aspect of the disclosure relates to exiting retimed mode without generating a glitch, missing clock cycles or extra clock cycles. When exiting retimed mode, the output ($F_{OUT}$) is switched from the $F_{RETIMED}$ signal to the $F_{CLK}$ signal. Since the $F_{RETIMED}$ signal lags the $F_{CLK}$ signal, using a technique similar to entering retimed mode, e.g., generating an appropriate FORCE1 logic-high pulse, may generate an output clock cycle whose period is shorter than that of the $F_{CLK}$ signal (shorter by roughly the amount of lag between the $F_{CLK}$ and $F_{RETIMED}$ signals), or may cause the resulting output to miss a clock cycle entirely.

Thus, rather than simply using a FORCE1 signal, a "catch-up" mode is provided. In the catch-up mode, the $F_{RETIMED}$ signal is temporarily altered to have a frequency higher than the $F_{CLK}$ signal. Doing so causes the lag between the $F_{CLK}$ and $F_{RETIMED}$ signals to eventually reduce to zero, and even causes $F_{RETIMED}$ to eventually lead $F_{CLK}$.

More specifically, in exemplary embodiments, to exit retimed mode, limit counter 137 (see FIGS. 4 and 6) employed in retimed mode, i.e. the counter used to limit the minimum retimed clock low and high times, may be used. Thus, limit counter 137 may be used to not only alter the timing characteristics of the retimed signal (as described above), but also to facilitate implementing the catch-up mode.

When exiting retimed mode, however, limit counter 137 is used to generate fixed low and high times (i.e., the periods of time during which the $F_{RETIMED}$ signal has logic low and logic high values, respectively) independent of the edges of the $F_{CLK}$ signal. The fixed low and high times generate a $F_{RETIMED}$ period less than the period of $F_{CLK}$. As a result, the $F_{RETIMED}$ signal will catch-up to the $F_{CLK}$ signal in phase.

Whether catch-up has occurred is detected by sampling the $F_{CLK}$ signal on edges of the $F_{RETIMED}$ signal (or on edges of the $F_{LO}$ signal that correspond to edges of the $F_{RETIMED}$ signal, given that the $F_{RETIMED}$ signal makes transitions on the edges of the $F_{LO}$ signal). In exemplary embodiments, flip-flops 140 and 163 and signal 166 are used by the control circuitry in limit counter 137 to perform the sampling operation. Flip-flops 140 and 163 serve as a synchronizer to safely sample $F_{CLK}$ on edges of $F_{LO}$.

Note that FIG. 6 shows merely one example of how the sampling operation may be performed. A variety of alternatives are contemplated in exemplary embodiments. As one example, an alternative to flip-flop 140, such as a register clocked by the $F_{RETIMED}$ signal or a gated version of the $F_{LO}$ signal may be used, as desired.

In exemplary embodiments, detection of whether the $F_{RETIMED}$ signal has "caught up" with the $F_{CLK}$ signal may be performed by the control circuitry in limit counter 137. More specifically, when the control circuitry in limit counter 137 samples the $F_{CLK}$ signal as logic high on a rising edge of the $F_{RETIMED}$ signal, followed by sampling the $F_{CLK}$ signal as logic low on the next rising edge of the $F_{RETIMED}$ signal, it has detected that the $F_{RETIMED}$ signal now leads the $F_{CLK}$ signal. In other words, the $F_{RETIMED}$ signal has caught up with the $F_{CLK}$ signal.

Once catch-up has been detected, a variety of techniques may be used in exemplary embodiments to switch the output MUX 146 so as to provide the $F_{CLK}$ signal rather than the $F_{RETIMED}$ signal as signal $F_{MUX}$. As merely one example, the FORCE1 signal may be used, similar to the technique employed to enter retimed mode, described above.

Figure 8:
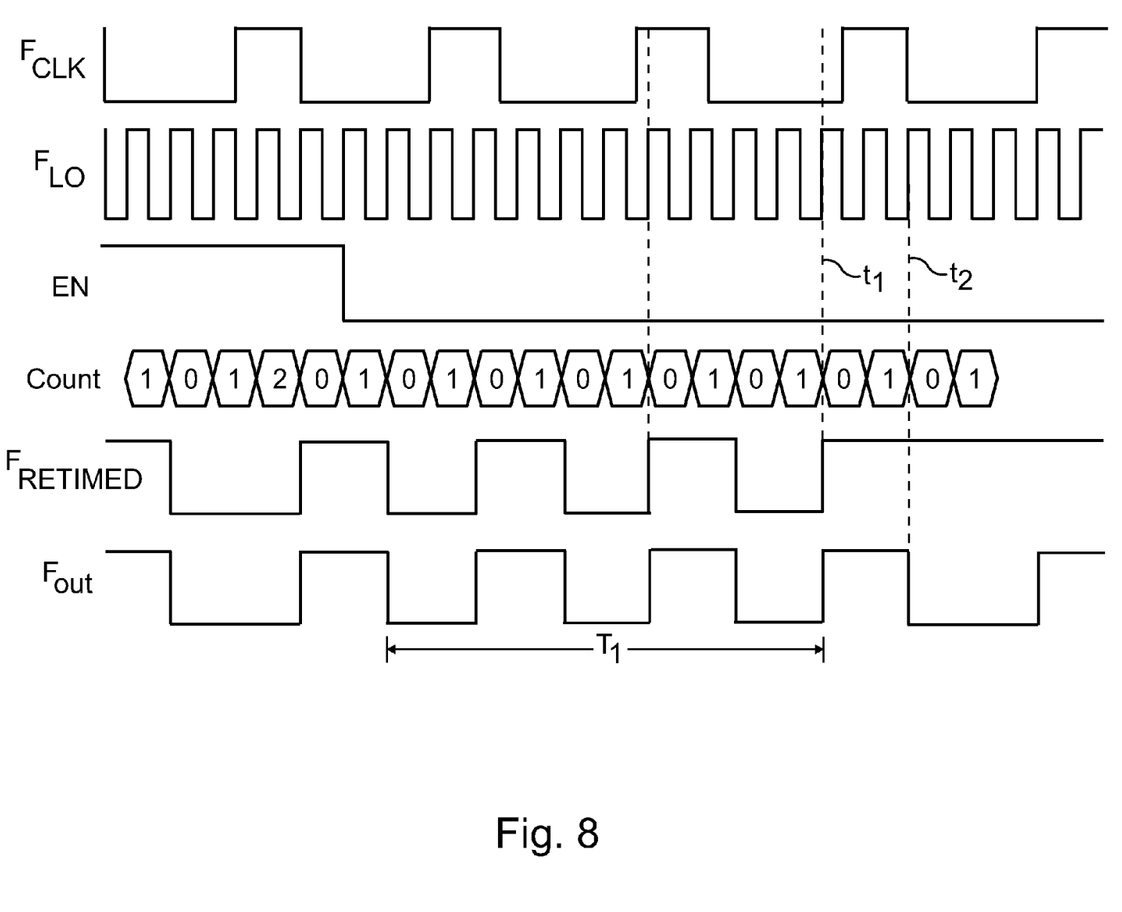
FIG. 8 shows a timing diagram for exiting retimed mode for an exemplary embodiment.

FIG. 8 shows a timing diagram for exiting retimed mode for an exemplary embodiment. Sometime after limit counter 137 detects that the EN input signal has a logic low value, the generated $F_{RETIMED}$ signal enters catch-up mode. In the example shown in FIG. 8, during catch-up the $F_{RETIMED}$ signal has fixed generated low and high times of two $F_{LO}$ periods, as indicated in the time period labeled "$T_1$."

A variety of techniques exist for defining the fixed low and high times are contemplated in exemplary embodiments. For example, in some embodiments, the fixed times can be defined by one or more of the LIMIT values provided to limit counter 137.

As another example, the fixed times may be provided via a value dedicated to catch-up mode.

At the time indicated by "$t_1$" in FIG. 8, the control circuitry in limit counter 137 samples the $F_{CLK}$ signal as logic high on the rising edge of the $F_{RETIMED}$ signal. At the time indicated by "$t_2$" in FIG. 8, the control circuitry in limit counter 137 samples the $F_{CLK}$ signal as logic low on the rising edge of the $F_{RETIMED}$ signal. This sequence indicates that the $F_{RETIMED}$ signal now leads the $F_{CLK}$ signal in phase.

To make a transition of the output signal ($F_{OUT}$) from the $F_{RETIMED}$ signal to the $F_{CLK}$ signal, the control circuit in limit counter 137 freezes the state of the $F_{RETIMED}$ signal. The control circuit in limit counter 137 also adds a delay of two cycles of the $F_{LO}$ signal, as indicated by the LIMIT input for the example in FIG. 8, at which time the select signal provided to output MUX 146 is changed. As a consequence, the output signal of MUX 146 and, hence, the output signal $F_{OUT}$, switches from the $F_{RETIMED}$ signal to the $F_{CLK}$ signal.

Because the $F_{RETIMED}$ signal provided to output MUX 146 is at logic high, the selection change does not cause a glitch at the output of MUX 146 (or the output signal, $F_{OUT}$). More specifically, if the $F_{CLK}$ signal is still at logic high when the select signal to output MUX 146 is changed, the output $F_{MUX}$ will remain at logic high. Conversely, if the $F_{CLK}$ signal is at logic low when the select signal to output MUX 146 is changed, the output $F_{MUX}$ will immediately go to a logic low value.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An apparatus comprising:
   analog or mixed-signal circuitry operating in response to a first signal;
   digital circuitry operating in response to a second signal; and
   a signal retiming circuit, comprising first and second flip-flops selectably coupled in a cascade configuration, generating the second signal to reduce interference between the digital circuitry and the analog or mixed-signal circuitry by retiming edges of an output signal of a digital signal source to fall on cycle boundaries of the first signal.

2. The apparatus according to claim 1, wherein the signal retiming circuit further comprises a limit counter coupled to the second flip-flop.

3. The apparatus according to claim 1, wherein the analog or mixed-signal circuitry comprises radio-frequency (RF) circuitry.

4. The apparatus according to claim 3, wherein the first signal comprises a local oscillator (LO) signal.

5. The apparatus according to claim 1, wherein the output signal of the digital signal source comprises a clock signal, and wherein the second signal comprises a retimed clock signal.

6. The apparatus according to claim 1, wherein the analog or mixed-signal circuitry resides in a first circuit partition and the digital circuitry resides in a second circuit partition.

7. The apparatus according to claim 6, wherein the first and second partitions are physically partitioned.

8. The apparatus according to claim 6, wherein the first and second partitions reside within an integrated circuit (IC).

9. An apparatus comprising:
   a first circuit that operates in response to a first signal;
   a second circuit that operates selectably in response to a second signal or a retimed version of the second signal; and
   a signal retiming circuit that retimes the second signal to generate the retimed version of the second signal, and manages transition of operation of the second circuit in response to the second signal or the retimed version of the second signal without generating glitches and missing or extra cycles in the retimed version of the second signal, the signal retiming circuit comprising first and second flip-flops selectably coupled in a cascade configuration.

10. The apparatus according to claim 9, wherein the signal retiming circuit further comprises a limit counter coupled to the first and second flip-flops.

11. The apparatus according to claim 9, wherein the analog or mixed-signal circuitry comprises radio-frequency (RF) circuitry, and wherein the first signal comprises a local oscillator (LO) signal.

12. The apparatus according to claim 11, wherein the second circuit comprises a microcontroller unit (MCU).

13. The apparatus according to claim 12, wherein the RF circuitry and the MCU are fabricated within an integrated circuit (IC).

14. The apparatus according to claim 9, wherein the second signal comprises a clock signal, and wherein the retimed version of the second signal comprises a retimed clock signal.

15. An apparatus comprising:
a circuit that operates selectably in response to a signal or a retimed version of the signal; and
a signal retiming circuit that manages transition of operation of the circuit in response to the retimed version of the signal to operation of the circuit in response to the signal by using a catch-up mode, the signal retiming circuit comprising a first flip-flop selectably coupled to a second flip-flop.

16. The apparatus according to claim 15, wherein in the catch-up mode, the retimed version of the signal is altered to reduce a lag between the signal and the retimed version of the signal.

17. The apparatus according to claim 15, wherein the retimed version of the signal is generated with fixed periods of time where the retimed version of the signal has logic low and logic high values.

18. The apparatus according to claim 15, wherein the signal retiming circuit samples the signal at times corresponding to edges of the retimed version of the signal to determine whether catch-up has occurred.

19. The apparatus according to claim 15, wherein the signal retiming circuit manages transition of operation of the circuit in response to the signal or the retimed version of the signal without generating glitches and missing or extra cycles in the retimed version of the signal.

20. The apparatus according to claim 15, wherein the signal retiming circuit further comprises a limit counter coupled to the second flip-flop.

\* \* \* \* \*